United States Patent
Cao et al.

(10) Patent No.: US 10,168,567 B2
(45) Date of Patent: Jan. 1, 2019

(54) GOA DRIVE CIRCUIT AND EMBEDDED TYPE TOUCH DISPLAY PANEL

(71) Applicant: Wuhan China Star Optoelectronics Technology Co., Ltd., Wuhan, Hubei (CN)

(72) Inventors: Shangcao Cao, Guangdong (CN); Ronglei Dai, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 63 days.

(21) Appl. No.: 15/515,254

(22) PCT Filed: Oct. 28, 2016

(86) PCT No.: PCT/CN2016/103711
§ 371 (c)(1),
(2) Date: Mar. 29, 2017

(87) PCT Pub. No.: WO2018/040268
PCT Pub. Date: Mar. 8, 2018

(65) Prior Publication Data
US 2018/0231818 A1    Aug. 16, 2018

(51) Int. Cl.
*G09G 3/36* (2006.01)
*G02F 1/1333* (2006.01)
(Continued)

(52) U.S. Cl.
CPC ...... *G02F 1/13338* (2013.01); *G02F 1/13306* (2013.01); *G06F 3/0412* (2013.01); *G09G 3/36* (2013.01)

(58) Field of Classification Search
CPC ...... G06F 3/0416; G06F 3/044; G06F 3/0412; G06F 3/04883
See application file for complete search history.

(56) References Cited

U.S. PATENT DOCUMENTS

2011/0150169 A1* 6/2011 Lin ............ G11C 19/28
377/64
2011/0316833 A1* 12/2011 Chang .......... G09G 3/3677
345/211
(Continued)

FOREIGN PATENT DOCUMENTS

| CN | 103943083 A | 7/2014 |
| CN | 105161067 A | 12/2015 |

(Continued)

*Primary Examiner* — Olga Merkoulova
(74) *Attorney, Agent, or Firm* — Andrew C. Cheng

(57) ABSTRACT

The present invention provides a GOA drive circuit and embedded type touch display panel. The GOA drive circuit comprises GOA units cascade coupled in multilevel, the nth level GOA unit comprises an output end pull down unit and an output control unit, both the output end pull down unit and the output control unit are employed to control a signal outputted by an output end of the nth level GOA unit, and one end of the output end pull down unit is coupled to a first end point, the first end point is loaded with a first signal, and one end of the output control unit is coupled to a nth clock signal, and as the embedded touch display panel enters signal interrupt and performs a touch scan, the output control unit is off to cut off an output path that the nth clock signal outputs to the output end.

16 Claims, 4 Drawing Sheets

(51) Int. Cl.
*G02F 1/133* (2006.01)
*G06F 3/041* (2006.01)

(56) References Cited

U.S. PATENT DOCUMENTS

| | | | | |
|---|---|---|---|---|
| 2014/0159997 A1* | 6/2014 | Chen | .................... | G09G 3/3611 |
| | | | | 345/87 |
| 2016/0247442 A1* | 8/2016 | Dai | ....................... | G09G 3/3677 |
| 2017/0123556 A1* | 5/2017 | Lin | ....................... | G06F 3/0412 |
| 2017/0256224 A1* | 9/2017 | Xiao | .................... | G09G 3/3677 |
| 2017/0364170 A1* | 12/2017 | Gu | ........................ | G02F 1/1362 |

FOREIGN PATENT DOCUMENTS

| | | | |
|---|---|---|---|
| CN | 105469766 A | 4/2016 |
| CN | 105513550 A | 4/2016 |
| JP | H0965257 A | 3/1997 |
| JP | 2006024350 A | 1/2006 |
| JP | 2016004280 A | 1/2016 |

\* cited by examiner

GOA DRIVE CIRCUIT AND EMBEDDED TYPE TOUCH DISPLAY PANEL

CROSS REFERENCE

This application claims the priority of Chinese Patent Application No. 201610761256.3, entitled "GOA drive circuit and embedded type touch display panel", filed on Aug. 29, 2016, the disclosure of which is incorporated herein by reference in its entirety.

FIELD OF THE INVENTION

The present invention relates to a display panel technology field, and more particularly to a GOA drive circuit and an embedded type touch display panel.

BACKGROUND OF THE INVENTION

The Liquid Crystal Display (LCD) possesses advantages of thin body, power saving and no radiation to be widely used in many application scope. The common liquid crystal display devices can be the liquid crystal television, the mobile phone, the Personal Digital Assistant (PDA), the digital camera or the notebook.

Gate Driver on Array (GOA) technology, i.e. the array substrate row driving technology is to utilize the array manufacture process of the Thin Film Transistor (TFT) liquid crystal display device to manufacture the gate driving circuit on the Thin Film Transistor array substrate for realizing the driving way of scanning the gates row by row. It possesses advantages of reducing the production cost and realizing the panel narrow frame design. The GOA circuit has two basic functions: the first is outputting the gate drive signal to drive the gate line in the panel for activating the TFTs in the display region to charge the pixel; the second is the shift register function, after the output of one gate drive scan signal is accomplished, the output of the next gate scan signal is controlled with the clock signal, and the transfer is so on. The GOA technology can decrease the bonding process of the external integrated chip, and has the chance to promote the productivity and to reduce the product cost, and the liquid crystal display panel can be employed to manufacture the liquid crystal display device of narrow frame.

The embedded touch control technology is to combine the liquid crystal display panel and the touch panel as one, and to embed the touch panel into the liquid crystal panel to make the liquid crystal display panel equipped with functions of display and sensing the touch control inputs at the same time. With the rapid development of the display technology, the touch control display panel has been widely applied and accepted, used by the people. For example, the smart phone, the flat panel computer and etc. all use the touch control display panel.

The present embedded type touch display technologies are mainly categorized into two types: one is that the touch control circuit is on the liquid crystal cell (On Cell), and the other is that the touch control circuit is inside the liquid crystal cell (In Cell). The In Cell type is also named to be the embedded type. The embedded type touch display panel requires signal interrupt function, in which as the GOA circuit normally works in display procedure, it has to shut down the output ends of the GOA units of all stages in the GOA circuit at arbitrary moment, and to stop the output of the gate scan signal for performing the touch scan. After the touch scan is accomplished, the GOA circuit returns to be normal, and continues to output the gate scan driving signal. However, as the single type GOA circuit realizes the signal interrupt function, one end of the liquid crystal capacitor receives the touch scan signal, and the other end receives the constant voltage level signal. Generally, the touch scan signal is a pulse signal different from the constant voltage level signal, and ultimately results in the delay of the touch scan signal outputted to the embedded touch display panel. Then, the detection accuracy as the embedded touch display panel detects the user's touch operation is influenced.

SUMMARY OF THE INVENTION

The present invention provides a GOA drive circuit, applied in an embedded touch display panel, wherein the GOA drive circuit (1) comprises a plurality of GOA units (10) which are cascade coupled in multilevel, and the nth level GOA unit comprises an output end pull down unit (400) and an output control unit (600), and both the output end pull down unit (400) and the output control unit (600) are employed to control a signal outputted by an output end (G(n)) of the nth level GOA unit, and one end of the output end pull down unit (400) is electrically coupled to a first end point (L), and the first end point (L) is loaded with a first signal, and one end of the output control unit (600) is electrically coupled to a nth clock signal (CK(n)), and as the embedded touch display panel enters signal interrupt and performs a touch scan stage, the output control unit (600) is off to cut off an output path that the nth clock signal (CK(n)) outputs to the output end (G(n)), and the output end pull down unit (400) is on to output the first signal through an output end of the GOA unit, wherein as the embedded touch display panel enters signal interrupt and performs the touch scan stage, the first signal is a signal consistent with a touch scan signal of the embedded touch display panel.

The output control unit (600) comprises a first thin film transistor (NT10) and a second first thin film transistor (NT13), and both the first thin film transistor (NT10) and the second first thin film transistor (NT13) comprise a gate, a first end and a second end, and the first end of the first thin film transistor (NT10) is electrically coupled to the output end (G(n)) of the nth level GOA unit, and the second end of the first thin film transistor (NT10) receives the nth clock signal (CK(n)), and the gate of the first thin film transistor (NT10) is electrically coupled to the second end of the second first thin film transistor (NT13), and the gate of the second first thin film transistor (NT13) receives the nth clock signal (CK(n)), and the first end of the second first thin film transistor (NT13) is loaded with a voltage level of a first node Q(n); as the embedded touch display panel enters signal interrupt and performs the touch scan stage, the output control unit (600) makes both the first thin film transistor (NT10) and the second first thin film transistor (NT13) off under control of the voltage level of the first node Q(n) and the nth clock signal (CK(n)) to close the output control unit (600), wherein the first end is a source and the second end is a drain, or the first end is a drain and the second end is a source.

The nth level GOA unit further comprises a first node control unit (100), a second node pull down control unit (200), a forward-backward scan level transfer control unit (300), a second node pull up control unit (500) and a voltage stabilizing unit (700);

the first node control unit (100) comprises a third thin film transistor (NT11) and a fourth thin film transistor (NT5), and both the third thin film transistor (NT11) and the fourth thin film transistor (NT5) comprise a gate, a first end and a second end, and the gate of the third thin film transistor (NT11) is electrically coupled to an output end (G(n−2)) of the (n−2)th level GOA unit, and the first end of the third thin film transistor (NT11) is electrically coupled to a first end point (L), and the second end of the third thin film transistor (NT11) is electrically coupled to a second node (P(n)), and the gate of the fourth thin film transistor (NT5) is electrically coupled to the second node (P(n)), and the first end of the fourth thin film transistor (NT5) is electrically coupled to the first end point (L), and the second end of the fourth thin film transistor (NT5) is electrically coupled to the first node Q(n), wherein the first end point (L) is loaded with the first signal;

the second node pull down control unit (200) comprises a fifth thin film transistor (NT6), and the fifth thin film transistor (NT6) comprises a gate, a first end and a second, and the gate of the fifth thin film transistor (NT6) is electrically coupled to the first node Q(n), and the first end of the fifth thin film transistor (NT6) is electrically coupled to the first end point (L), and the second end of the fifth thin film transistor (NT6) is electrically coupled to the second node (P(n));

the forward-backward scan level transfer control unit (300) comprises a sixth thin film transistor (NT1) and a seventh thin film transistor (NT2), and both the sixth thin film transistor (NT1) and the seventh thin film transistor (NT2) comprise a gate, a first end and a second end, and the gate of the sixth thin film transistor (NT1) is electrically coupled to the output end (G(n−2)) of the (n−2)th level GOA unit, and the first end of the sixth thin film transistor (NT1) is electrically coupled to the first node (Q(n)), and the second end of the sixth thin film transistor (NT1) receives a forward scan control signal (U2D), and the gate of the seventh thin film transistor (NT2) is electrically coupled to an output end (G(n+2)) of the (n+2)th level GOA unit, and the first end of the seventh thin film transistor (NT2) is electrically coupled to the first node (Q(n)), and the second end of the seventh thin film transistor (NT2) receives a backward scan control signal (D2U);

the output end pull down unit (400) comprises an eighth thin film transistor (NT9) and a ninth thin film transistor (NT12), and both the eighth thin film transistor (NT9) and a ninth thin film transistor (NT12) comprise a gate, a first end and a second end, and the gate and the first end of the eighth thin film transistor (NT9) are electrically coupled to two ends of a first capacitor (C1) respectively, and the gate of the eighth thin film transistor (NT9) is electrically coupled to the second node (P(n)), and the first end of the eighth thin film transistor (NT9) is electrically coupled to the first end point (L), and the second end of the eighth thin film transistor (NT9) is electrically coupled to the second node (P(n)) through a second capacitor (C2), and the second end of the eighth thin film transistor (NT9) is electrically coupled to the output end (G(n)) of the nth level GOA unit, and the gate of the ninth thin film transistor (NT12) receives a global control signal (GAS1), and the first end of the ninth thin film transistor (NT12) is electrically coupled to the first end point (L), and the second end of the ninth thin film transistor (NT12) is electrically coupled to the output end (G(n)) of the nth level GOA unit;

the second node pull up control unit (500) comprises a tenth thin film transistor (NT3), an eleventh thin film transistor (NT4) and a twelfth thin film transistor (NT8), and all the tenth thin film transistor (NT3), the eleventh thin film transistor (NT4) and the twelfth thin film transistor (NT8) comprise a gate, a first end and a second end, and the gate of the tenth thin film transistor (NT3) receives a forward scan control signal (U2D), and the first end of the tenth thin film transistor (NT3) is electrically coupled to the gate of the twelfth thin film transistor (NT8), and the second end of the tenth thin film transistor (NT3) is electrically coupled to a (n−1)th clock signal (CK(n−1)), and the gate of the eleventh thin film transistor (NT4) receives a backward scan control signal (D2U), and the first end of the eleventh thin film transistor (NT4) is electrically coupled to the gate of the twelfth thin film transistor (NT8), and the second end of the eleventh thin film transistor (NT4) is electrically coupled to a (n+1)th clock signal (CK(n+1)), and the first end of the twelfth thin film transistor (NT8) is electrically coupled to the second node (P(n)), and the second end of the twelfth thin film transistor (NT8) is electrically coupled to a second end point (H), and the second end point (H) is loaded with a second signal, the GOA unit (10) further comprises the voltage stabilizing unit (700), and the voltage stabilizing unit (700) comprises a thirteenth thin film transistor (NT7), and the thirteenth thin film transistor (NT7) comprises a gate, a first end and a second end, and the gate of the thirteenth thin film transistor (NT7) is electrically coupled to the second end point (H), and the first end of the thirteenth thin film transistor (NT7) is electrically coupled to the first node (Q(n)), and the second end of the thirteenth thin film transistor (NT7) is electrically coupled to the first end of the second first thin film transistor (NT13), wherein the first ends and the second ends of the respective thin film transistors respectively are sources and drains, or the first ends and the second ends of the respective thin film transistors respectively are drains and sources;

as the embedded touch display panel normally displays, one of the first signal and the second signal is low voltage level and the other is high voltage level, and one of the forward scan control signal (U2D) and the backward scan control signal (D2U) is low voltage level and the other is high voltage level, and the global control signal (GAS1) controls the ninth thin film transistors (NT12) in the GOA units of all levels to be off, and the output end (G(n)) employs the nth clock signal (CK(n)) to be a gate scan signal to be outputted; as the embedded touch display panel enters signal interrupt and performs the touch scan, the first signal is a pulse signal consistent with the touch control signal, and voltage levels of the forward scan control signal (U2D) and the backward scan control signal (D2U) are both high or both low, and the nth clock signal (CK(n)) controls the second first thin film transistor (NT13) to be off, and the global control signal (GAS1) controls the ninth thin film transistors (NT12) in the GOA units of all levels to be on, and output ends of the GOA units of all levels output the first signal which is consistent with the touch scan signal.

In the first level GOA unit and the second level GOA unit, both the gates of the sixth thin film transistor (NT1) and the third thin film transistor (NT11) receive a start signal of the GOA drive circuit; in the last level GOA unit and the next to last level GOA unit, the gate of the seventh thin film transistor (NT2) receives the start signal of the GOA drive circuit.

All the respective thin film transistors are N type thin film transistors; as the embedded touch display panel normally displays, the first signal is low voltage level and the second signal is high voltage level, and the global control signal (GAS1) is low voltage level, and all the respective clock signals are periodic high voltage level pulse signals; as the embedded touch display panel enters signal interrupt and performs the touch scan, all the respective clock signals are low voltage levels, and the global control signal (GAS1) is high voltage level.

In forward scan, the forward scan control signal (U2D) is constant voltage high voltage level, and the backward scan control signal (D2U) is low voltage level as the embedded touch display panel normally displays, and is high voltage level as entering signal interrupt and performing the touch scan; in backward scan, the backward scan control signal (D2U) is constant voltage high voltage level, and the forward scan control signal (U2D) is low voltage level as the embedded touch display panel normally displays, and is high voltage level as entering signal interrupt and performing the touch scan.

All the respective thin film transistors are P type thin film transistors; as the embedded touch display panel normally displays, the first signal is low voltage level, and the second signal is constant voltage low voltage level, and the global control signal (GAS1) is high voltage level, and all the respective clock signals are periodic low voltage level pulse signals; as the embedded touch display panel enters signal interrupt and performs the touch scan, all the respective clock signals are high voltage levels, and the global control signal (GAS1) is low voltage level.

In forward scan, the forward scan control signal (U2D) is constant voltage low voltage level, and the backward scan control signal (D2U) is high voltage level as the embedded touch display panel normally displays, and is low voltage level as entering signal interrupt and performing the touch scan; in backward scan, the backward scan control signal (D2U) is constant voltage low voltage level, and the forward scan control signal (U2D) is high voltage level as the embedded touch display panel normally displays, and is low voltage level as entering signal interrupt and performing the touch scan.

The GOA drive circuit comprises four clock signals: a first clock signal (CK(1)), a second clock signal (CK(2)), a third clock signal (CK(3)) and a fourth clock signal (CK(4)); as the nth clock signal (CK(n)) is the fourth clock signal (CK(4)), the n+1th clock signal (CK(n+1)) is the first clock signal (CK(1)); as the nth clock signal (CK(n)) is the first clock signal (CK(1)), the n−1th clock signal (CK(n−1)) is the fourth clock signal (CK(4)), and pulse periods of the first clock signal (CK(1)), the second clock signal (CK(2)), the third clock signal (CK(3)) and the fourth clock signal (CK(4)) are the same, and for the mth pulse signals of all the clock signals: as the mth pulse signal of the first clock signal (CK(1)) is finished, the mth pulse signal of the second clock signal (CK(2)) is generated; as the mth pulse signal of the second clock signal (CK(2)) is finished, the mth pulse signal of the third clock signal (CK(3)) is generated; as the mth pulse signal of the third clock signal (CK(3)) is finished, the mth pulse signal of the fourth clock signal (CK(4)) is generated; as the mth pulse signal of the fourth clock signal (CK(4)) is finished, the (m+1)th pulse signal of the first clock signal (CK(1)) is generated, wherein m is a positive integer.

In comparison with prior art, the nth level GOA unit of the GOA drive circuit according to the present invention comprises the output end pull down unit and the output control unit. Both the output end pull down unit and the output control unit are employed to control the signal outputted by the output end of the nth level GOA unit. One end of the output end pull down unit is electrically coupled to a first end point L, and the first end point L is loaded with a first signal, and one end of the output control unit is electrically coupled to a nth clock signal, and as the embedded touch display panel enters signal interrupt and performs a touch scan stage, the output control unit is off to cut off an output path that the nth clock signal outputs to the output end, and the output end pull down unit is on to output the first signal through an output end of the GOA unit, wherein as the embedded touch display panel enters signal interrupt and performs the touch scan stage, the first signal is a signal consistent with a touch scan signal of the embedded touch display panel. Accordingly, the signals of the output ends of the GOA units of all levels are consistent with the scan touch signal to decrease the delay of the touch scan signal, and thus to promote the detection accuracy as the embedded touch display panel detects the user's touch operation.

The present invention further provides an embedded touch display panel. The embedded touch display panel comprises the GOA drive circuit as described in any of the aforesaid embodiments.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
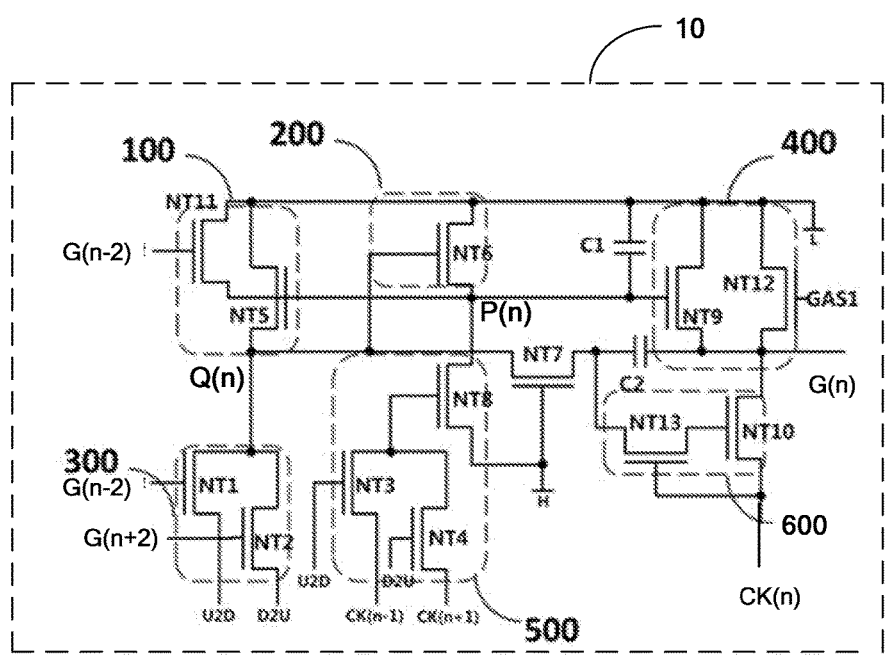
FIG. 1 is a circuit diagram of one preferred embodiment of an nth level GOA unit in a GOA drive circuit according to the present invention.
Figure 2:
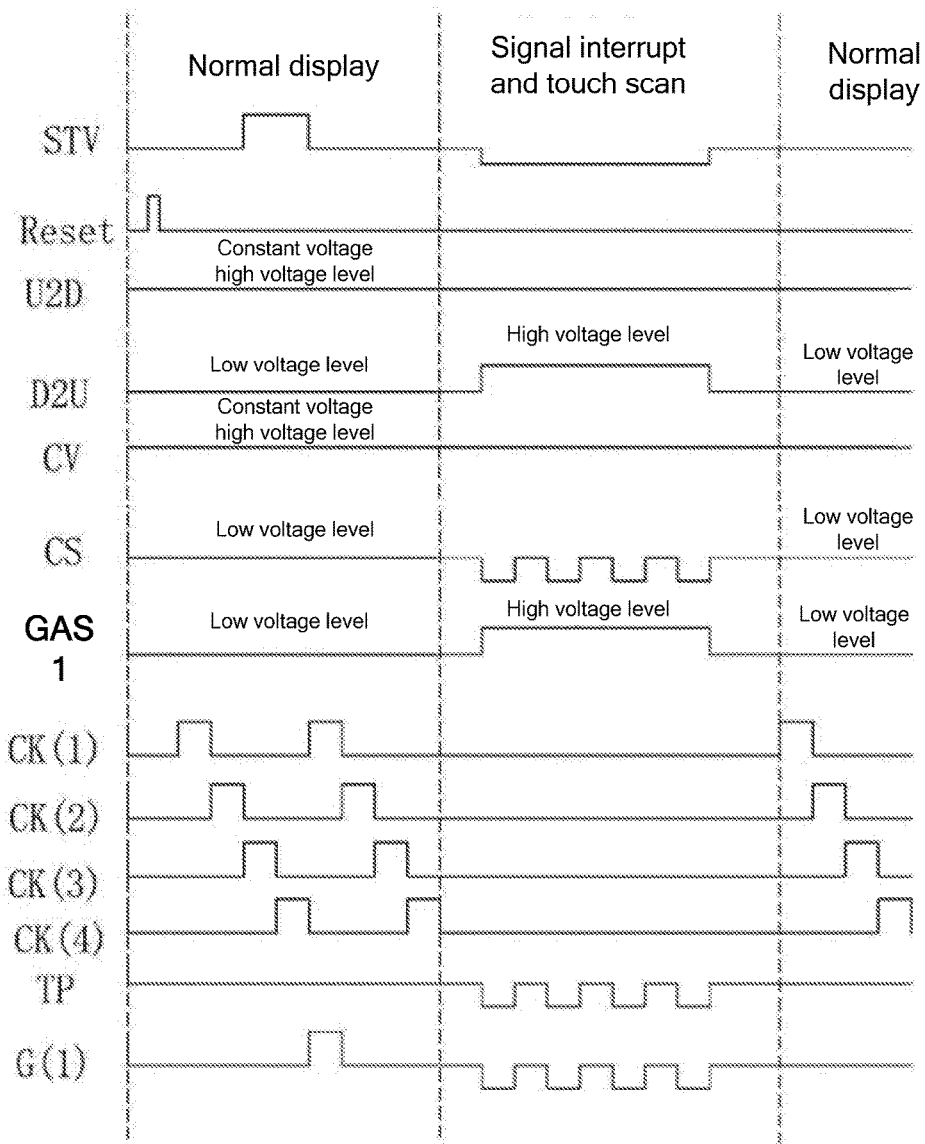
FIG. 2 is a sequence diagram as the GOA drive circuit shown in FIG. 1 perform forward scan.
Figure 3:
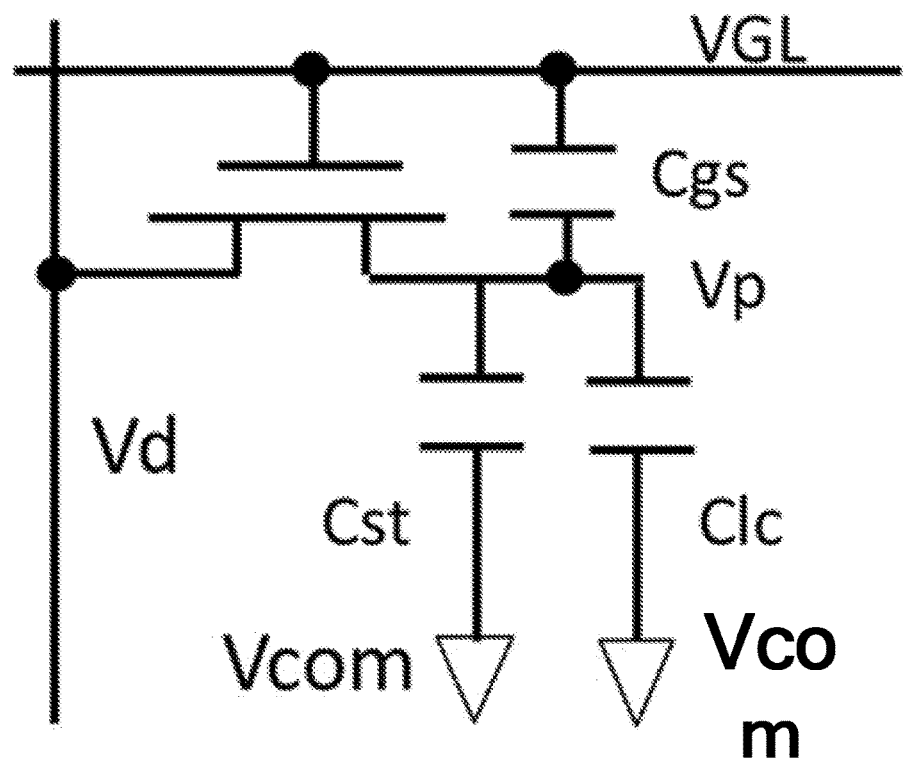
FIG. 3 is a drive circuit diagram of one pixel in an embedded touch display panel which is applied with a GOA drive circuit according to the present invention.

Please refer to FIG. 1 and FIG. 2. FIG. 1 is a circuit diagram of one preferred embodiment of a nth level GOA unit in a GOA drive circuit according to the present invention; FIG. 2 is a sequence diagram as the GOA drive circuit shown in FIG. 1 perform forward scan; FIG. 3 is a drive circuit diagram of one pixel in an embedded touch display panel which is applied with a GOA drive circuit according to the present invention. The GOA drive circuit 1 comprises a plurality of GOA units 10 which are cascade coupled in multilevel, and the nth level GOA unit comprises an output end pull down unit 400 and an output control unit 600. Both the output end pull down unit 400 and the output control unit 600 are employed to control a signal outputted by an output end G(n) of the nth level GOA unit. One end of the output end pull down unit 400 is electrically coupled to a first end point L, and the first end point L is loaded with a first signal. One end of the output control unit 600 is electrically coupled to an nth clock signal CK(n). As the embedded touch display panel enters signal interrupt and performs a touch scan stage, the output control unit 600 is off to cut off an output path that the nth clock signal CK(n) outputs to the output end G(n), and the output end pull down unit 400 is on to output the first signal through an output end of the GOA unit. As the embedded touch display panel enters signal interrupt and performs the touch scan stage, the first signal is a signal consistent with a touch scan signal of the embedded touch display panel.

The output control unit 600 comprises a first thin film transistor NT10 and a second first thin film transistor NT13. Both the first thin film transistor NT10 and the second first thin film transistor NT13 comprise a gate, a first end and a second end. The first end of the first thin film transistor NT10 is electrically coupled to the output end G(n) of the nth level GOA unit, and the second end of the first thin film transistor NT10 receives the nth clock signal CK(n), and the gate of the first thin film transistor NT10 is electrically coupled to the second end of the second first thin film transistor NT13. The gate of the second first thin film transistor NT13 receives the nth clock signal CK(n), and the first end of the second first thin film transistor NT13 is loaded with a voltage level of a first node Q(n). As the embedded touch display panel enters signal interrupt and performs the touch scan stage, the output control unit 600 makes both the first thin film transistor NT10 and the second first thin film transistor NT13 off under control of the voltage level of the first node Q(n) and the nth clock signal CK(n) to close the output control unit 600. The first end is a source and the second end is a drain, or the first end is a drain and the second end is a source.

The nth level GOA unit further comprises a first node control unit 100, a second node pull down control unit 200, a forward-backward scan level transfer control unit 300, a second node pull up control unit 500 and a voltage stabilizing unit 700.

Descriptions for the circuit structures of the respective units of the nth level GOA unit of the GOA drive circuit 1 according to the present invention are conducted below, wherein n is a positive integer.

The first node control unit 100 comprises a third thin film transistor NT11 and a fourth thin film transistor NT5. Both the third thin film transistor NT11 and the fourth thin film transistor NT5 comprise a gate, a first end and a second end. The gate of the third thin film transistor NT11 is electrically coupled to an output end G(n−2) of the (n−2)th level GOA unit, and the first end of the third thin film transistor NT11 is electrically coupled to a first end point L, and the second end of the third thin film transistor NT11 is electrically coupled to a second node P(n). The gate of the fourth thin film transistor NT5 is electrically coupled to the second node P(n), and the first end of the fourth thin film transistor NT5 is electrically coupled to the first end point L, and the second end of the fourth thin film transistor NT5 is electrically coupled to the first node Q(n), wherein the first end point L is loaded with the first signal.

The second node pull down control unit 200 comprises a fifth thin film transistor NT6. The fifth thin film transistor NT6 comprises a gate, a first end and a second. The gate of the fifth thin film transistor NT6 is electrically coupled to the first node Q(n), and the first end of the fifth thin film transistor NT6 is electrically coupled to the first end point L, and the second end of the fifth thin film transistor NT6 is electrically coupled to the second node P(n).

The forward-backward scan level transfer control unit 300 comprises a sixth thin film transistor NT1 and a seventh thin film transistor NT2. Both the sixth thin film transistor NT1 and the seventh thin film transistor NT2 comprise a gate, a first end and a second end. The gate of the sixth thin film transistor NT1 is electrically coupled to the output end G(n−2) of the (n−2)th level GOA unit, and the first end of the sixth thin film transistor NT1 is electrically coupled to the first node Q(n), and the second end of the sixth thin film transistor NT1 receives a forward scan control signal U2D. The gate of the seventh thin film transistor NT2 is electrically coupled to an output end G(n+2) of the (n+2)th level GOA unit, and the first end of the seventh thin film transistor NT2 is electrically coupled to the first node Q(n), and the second end of the seventh thin film transistor NT2 receives a backward scan control signal D2U.

The output end pull down unit 400 comprises an eighth thin film transistor NT9 and a ninth thin film transistor NT12. Both the eighth thin film transistor NT9 and a ninth thin film transistor NT12 comprise a gate, a first end and a second end. The gate and the first end of the eighth thin film transistor NT9 are electrically coupled to two ends of a first capacitor C1 respectively, and the gate of the eighth thin film transistor NT9 is electrically coupled to the second node P(n), and the first end of the eighth thin film transistor NT9 is electrically coupled to the first end point L, and the second end of the eighth thin film transistor NT9 is electrically coupled to the second node P(n) through a second capacitor C2, and the second end of the eighth thin film transistor NT9 is electrically coupled to the output end G(n) of the nth level GOA unit. The gate of the ninth thin film transistor NT12 receives a global control signal GAS1, and the first end of the ninth thin film transistor NT12 is electrically coupled to the first end point L, and the second end of the ninth thin film transistor NT12 is electrically coupled to the output end G(n) of the nth level GOA unit.

The second node pull up control unit 500 comprises a tenth thin film transistor NT3, an eleventh thin film transistor NT4 and a twelfth thin film transistor NT8. Both the tenth thin film transistor NT3 and the eleventh thin film transistor NT4 comprise a gate, a first end and a second end. The gate of the tenth thin film transistor NT3 receives a forward scan control signal U2D, and the first end of the tenth thin film transistor NT3 is electrically coupled to the gate of the twelfth thin film transistor NT8, and the second end of the tenth thin film transistor NT3 is electrically coupled to a (n−1)th clock signal CK(n−1). The gate of the eleventh thin film transistor NT4 receives a backward scan control signal D2U, and the first end of the eleventh thin film transistor NT4 is electrically coupled to the gate of the twelfth thin film transistor NT8, and the second end of the eleventh thin film transistor NT4 is electrically coupled to a (n+1)th clock signal CK(n+1). The first end of the twelfth thin film transistor NT8 is electrically coupled to the second node P(n), and the second end of the twelfth thin film transistor NT8 is electrically coupled to a second end point H.

The voltage stabilizing unit 700 comprises a thirteenth thin film transistor NT7. The thirteenth thin film transistor NT7 comprises a gate, a first end and a second end. The gate of the thirteenth thin film transistor NT7 is electrically coupled to the second end point H, and the second end point H is loaded with the second voltage level, and the first end of the thirteenth thin film transistor NT7 is electrically coupled to the first node Q(n), and the second end of the thirteenth thin film transistor NT7 is electrically coupled to the first end of the second first thin film transistor NT13.

In one embodiment, the first ends and the second ends of the respective thin film transistors respectively are sources and drains, i.e. the first ends of the respective thin film transistors are sources, and the second ends are drains; or in another embodiment, the first ends and the second ends of the respective thin film transistors respectively are drains and sources, i.e. the first ends of the respective thin film transistors are drains, and the second ends are sources.

In the first level GOA unit and the second level GOA unit, both the gates of the sixth thin film transistor NT1 and the third thin film transistor NT11 receive a start signal of the GOA drive circuit; in the last level GOA unit and the next to last level GOA unit, the gate of the seventh thin film transistor NT2 receives the start signal of the GOA drive circuit. For convenience, the start signal of the GOA drive circuit in FIG. 2 is indicated with STV.

As the embedded touch display panel normally displays, the first signal and the second signal are signals of which the voltage levels are opposite, i.e. one of the first signal and the second signal is low voltage level and the other is high voltage level; the forward scan control signal U2D and the backward scan control signal D2U are voltage levels of which the voltage levels are opposite, i.e. one of the forward scan control signal U2D and the backward scan control signal D2U is low voltage level and the other is high voltage level; the global control signal (GAS1) controls the ninth thin film transistors NT12 in the GOA units of all levels to be off, and the output end G(n) employs the nth clock signal CK(n) to be a gate scan signal to be outputted. As the embedded touch display panel enters signal interrupt and performs the touch scan, the first signal is a pulse signal consistent with the touch control signal, and voltage levels of the forward scan control signal U2D and the backward scan control signal D2U are both high or both low, and the nth clock signal CK(n) controls the second first thin film transistor NT13 to be off, and the global control signal GAS1 controls the ninth thin film transistors NT12 in the GOA units of all levels to be on, and output ends of the GOA units of all levels output the first signal which is consistent with the touch scan signal.

The respective thin film transistors are all N-type thin film transistors as shown in FIG. 1. As the embedded touch display panel normally displays, the first signal is low voltage level and the second signal is constant voltage high voltage level, and the global control signal GAS1 is low voltage level, and all the respective clock signals are periodic high voltage level pulse signals; as the embedded touch display panel enters signal interrupt and performs the touch scan, all the respective clock signals are low voltage levels, and the global control signal GAS1 is high voltage level. Furthermore, in forward scan, the forward scan control signal U2D is constant voltage high voltage level, and the backward scan control signal D2U is low voltage level as the embedded touch display panel normally displays, and is high voltage level as entering signal interrupt and performing the touch scan. In backward scan, the backward scan control signal D2U is constant voltage high voltage level, and the forward scan control signal (U2D) is low voltage level as the embedded touch display panel normally displays, and is high voltage level as entering signal interrupt and performing the touch scan. For convenience, the first signal is indicated with CS in FIG. 2, and the second signal is indicated with CV in FIG. 2.

All the respective thin film transistors are P type thin film transistors; as the embedded touch display panel normally displays, the first signal is low voltage level, and the second signal is constant voltage low voltage level, and the global control signal GAS1 is high voltage level, and all the respective clock signals are periodic low voltage level pulse signals; as the embedded touch display panel enters signal interrupt and performs the touch scan, all the respective clock signals are high voltage levels, and the global control signal GAS1 is low voltage level. Furthermore, in forward scan, the forward scan control signal U2D is constant voltage low voltage level, and the backward scan control signal D2U is high voltage level as the embedded touch display panel normally displays, and is low voltage level as entering signal interrupt and performing the touch scan. In backward scan, the backward scan control signal D2U is constant voltage low voltage level, and the forward scan control signal U2D is high voltage level as the embedded touch display panel normally displays, and is low voltage level as entering signal interrupt and performing the touch scan.

Specifically, the GOA drive circuit comprises four clock signals: a first clock signal CK(1), a second clock signal CK(2), a third clock signal CK(3) and a fourth clock signal CK(4). As the nth clock signal CK(n) is the fourth clock signal CK(4), the (n+1)th clock signal CK(n+1) is the first clock signal CK(1); as the nth clock signal CK(n) is the first clock signal CK(1), the (n−1)th clock signal CK(n−1) is the fourth clock signal CK(4).

As the embedded touch display panel normally displays, pulse periods of the first clock signal CK(1), the second clock signal CK(2), the third clock signal CK(3) and the fourth clock signal CK(4) are the same, and for the mth pulse signals of all the clock signals: as the mth pulse signal of the first clock signal CK(1) is finished, the mth pulse signal of the second clock signal CK(2) is generated; as the mth pulse signal of the second clock signal CK(2) is finished, the mth pulse signal of the third clock signal CK(3) is generated; as the mth pulse signal of the third clock signal CK(3) is finished, the mth pulse signal of the fourth clock signal CK(4) is generated; as the mth pulse signal of the fourth clock signal CK(4) is finished, the (m+1)th pulse signal of the first clock signal CK(1) is generated, wherein m is a positive integer. For an illustration, the first clock signal CK(1) is first generated, and the first pulse signal of the second clock signal CK(2) is generated while the first pulse signal of the first clock signal CK(1) is finished; the first pulse signal of the third clock signal CK(3) is generated while the first pulse signal of the second clock signal CK(2) is finished; the first pulse signal of the fourth clock signal CK(4) is generated while the first pulse signal of the third clock signal CK(3) is finished; the second pulse signal of the first clock signal CK(1) is generated while the first pulse signal of the fourth clock signal CK(4) is finished, and so on. As the embedded touch display panel enters signal interrupt and performs the touch scan, all the first clock signal CK(1), the second clock signal CK(2), the third clock signal CK(3) and the fourth clock signal CK(4) are low voltage levels.

Furthermore, the GOA circuit of the present invention performs scan in an interlaced scan manner, and the output end of the fth level GOA unit is electrically coupled to the (f+2)th level GOA unit, wherein f is a positive integer. As an illustration, and the output end of the first level GOA unit is electrically coupled to the third level GOA unit, and the output end of the second level GOA unit is electrically coupled to the fourth level GOA unit, and the output end of the third level GOA unit is electrically coupled to the fifth level GOA unit, and the output end of the fourth level GOA unit is electrically coupled to the sixth level GOA unit, and so on.

Please refer to FIG. 1 and FIG. 2 at the same time. It is illustrated that the forward scan is performed and the respective thin film transistors are N type thin film transistors in the GOA drive circuit of the present invention for explaining the specific working procedure of the GOA drive circuit of the present invention. In forward scan, i.e. the scan direction is from the first level GOA unit to the last level GOA unit.

1. normal display stage:

First, the output end G(n−2) of the (n−2)th level GOA unit provides high voltage level, and in the first level GOA unit and the second level GOA unit, the start signal STV of the circuit provides high voltage level, and the sixth thin film transistor NT1 is on, and the forward scan control signal U2D of constant voltage high voltage level charges the first node Q(n) to high voltage level through the sixth thin film transistor NT1; the thirteenth thin film transistor is constantly on under control of the constant voltage high voltage level of the second end point H; meanwhile, the third thin film transistor NT11 is on, and the second node P(n) is pulled down to low voltage level of the first end point L, and the both the fourth thin film transistor NT5 and the eighth thin film transistor NT9 which are controlled by the second node P(n) are off; the tenth thin film transistor NT3 controlled by the forward scan control signal U2D is on, and the (n+1)th clock signal is low voltage level, and the twelfth thin film transistor NT8 is off, and the nth clock signal CK(n) is low voltage level, and the second thin film transistor NT13 is off, and the output end G(n) of the nth level GOA unit is low voltage level.

Then, the output end G(n−2) of the (n−2)th level GOA unit is changed to be low voltage level, and the nth clock signal CK(n) is changed to be high voltage level, and the second thin film transistor NT13 is on, and the first node Q(n) is kept to be high voltage level, and the first thin film transistor NT10 controlled by the first node Q(n) is on, and the high voltage level of the nth clock signal CK(n) is employed to be the gate scan signal to be outputted from the output end G(n) of the nth level GOA unit through the first thin film transistor NT10 and the second thin film transistor NT13; meanwhile, the fifth thin film transistor NT6 controlled by the first node Q(n) is on, and the second node P(n) is kept to be low voltage level, and the fourth thin film transistor NT5 and the eighth thin film transistor NT9 are kept to be off.

Then, the nth clock signal CK(n) is changed to be low voltage level, and the (n+1)th clock signal CK(n+1) provides high voltage level, and the twelfth thin film transistor NT8 is on, and the high voltage level of the second end point H charges the second node P(n) to high voltage level through the twelfth thin film transistor NT8, and the fourth thin film transistor NT5 is on, and the first node Q(n) is pulled down to low voltage level of the first end point L, and the first thin film transistor NT10 and the second thin film transistor NT13 are off, and the eighth thin film transistor NT9 is on, and the output end G(n) of the nth level GOA unit is pulled down to be low voltage level of the first end point L.

Finally, the (n+1)th clock signal CK(n+1) is changed to be low voltage level, and the second node P(n) is kept to be high voltage level with the storage function of the first capacitor C1, and the output end G(n) of the nth level GOA unit is kept to be low voltage level.

In the entire normal display stage, all the ninth thin film transistors NT12 in the GOA units of the respective levels are controlled by the global control signal GAS1 of low voltage level to be constantly deactivated.

2. signal interrupt and touch scan stage:

All the respective clock signals are low voltage levels, and all the second thin film transistors NT13 in the GOA units of respective levels are off to stop the output path of the clock signal, and thus to prevent the output competition of the output end due to the output of the clock signal; the global control signal GAS1 is changed to be high voltage level, and the ninth thin film transistors NT12 in the respective GO units are on, and the output end G(n) of the nth GOA unit receives the first signal of the first end point L, and then, the signal of the first end point L is changed from low voltage level to the pulse signal consistent with the touch scan signal, and therefore, the output end G(n) of the nth GOA unit outputs the first CS consistent with the touch scan signal.

Furthermore, referring to FIG. 3, and FIG. 3 is a driving circuit of one pixel in the display panel according to prior art. The drive circuit of the pixel comprises: a drive thin film transistor T, a storage capacitor Cst, a liquid crystal capacitor Clc and a gate source capacitor Cgs. The gate of the drive thin film transistor T is electrically coupled to the output end G(n) of one level GOA unit of the GOA circuit. For convenience, in FIG. 3, VGL represents the output end G(n) of one level GOA unit of the GOA circuit. The drain receives the data voltage Vd, and the source is electrically coupled to one end of the storage capacitor Cst, one end of the liquid crystal capacitor Clc and one end of the gate source capacitor Cgs. The other end of the storage capacitor Cst is electrically coupled to the common voltage signal Vcom; the other end of the liquid crystal capacitor Clc is electrically coupled to the common voltage signal Vcom; the other end of the gate source capacitor Cgs is electrically coupled to the output end G(n) of one level GOA unit of the GOA circuit.

In the signal interrupt and touch scan stage, the common voltage signal Vcom is employed to be the touch scan signal (For convenience, the touch scan signal is indicated with TP in FIG. 2) to output the periodic pulse signal. Because the potential jump occurs at the ends of the storage capacitor Cst and the liquid crystal capacitor Clc, which are coupled to the common voltage signal Vcom, and results in that the jumps also occur to the voltage levels Vp of the ends of the storage capacitor Cst and the liquid crystal capacitor Clc, which are coupled to the source of the drive thin film transistor T. Then, the output end G(n) of one level GOA unit of the GOA circuit outputs the first signal CS. If the first signal CS still utilizes the constant voltage low voltage level signal according to prior art, it will lead to the generation of the voltage difference at the two ends of the gate source capacitor Cgs, and the delay to the common voltage signal Vcom, i.e. the periodic pulse of the touch scan signal, and thus to results in the descent of the detection accuracy as the embedded touch display panel detects the user's touch operation. The GOA drive circuit of the present invention set the first signal CS to be the periodic pulse signal consistent with the touch scan signal (i.e. the common voltage signal Vcom, then) in the signal interrupt and touch scan stage, and the potential jumps of the two ends of the gate source capacitor Cgs are consistent, which can effectively reduce the delay of the touch scan signal TP, and thus to promote the detection accuracy as the embedded touch display panel detects the user's touch operation.

Meanwhile, for the GOA units keeping the first node Q(n) to be high voltage level in the GOA drive circuit, although, the first thin film transistors NT10 in these GOA units are on, the nth clock signal CK(n) is low voltage level, second thin film transistors NT13 and the first thin film transistors NT10 are off. Therefore, in comparison with prior art, it can effectively prevent the output competition of the nth clock signal CK(n) and the first signal CS in the signal interrupt and touch scan stage to promote the stability of the touch scan.

3. finishing the signal interrupt and touch scan stage and entering the normal display stage, again.

The signal interrupt and touch scan stage is finished, and then the backward scan is performed as entering the normal display stage, again. The backward scan is that the scan direction is scanning from the last level GOA unit toward the first level GOA unit. The working procedure of the backward scan is similar with the forward scan. What is need is to change the backward scan control signal D2U to be constant high voltage level, and to change the forward scan control signal U2D to be low voltage level as the embedded touch display panel normally displays, and in signal interrupt and touch scan, it is set to be high voltage level, and the scan direction is changed from scanning from the first level GOA unit toward the last level GOA unit to be scanning from the last level GOA unit toward the first level GOA unit to be scanned. No detail description is repeated here.

It can be understood that the specific working principle as the respective thin film transistors are P type thin film transistors is similar with that as the respective thin film transistors are N type thin film transistors. It is fine only to change the high and low of the voltage levels of the respective signal and the respective nodes, and the repeated description is omitted here.

In comparison with prior art, the nth level GOA unit of the GOA drive circuit according to the present invention comprises the output end pull down unit 400 and the output control unit 600. Both the output end pull down unit 400 and the output control unit 600 are employed to control a signal outputted by an output end G(n) of the nth level GOA unit. One end of the output end pull down unit 400 is electrically coupled to a first end point L, and the first end point L is loaded with a first signal, and one end of the output control unit 600 is electrically coupled to a nth clock signal CK(n), and as the embedded touch display panel enters signal interrupt and performs a touch scan stage, the output control unit 600 is off to cut off an output path that the nth clock signal CK(n) outputs to the output end G(n), and the output end pull down unit 400 is on to output the first signal through an output end of the GOA unit, wherein as the embedded touch display panel enters the touch scan stage, the first signal is a signal consistent with a touch scan signal of the embedded touch display panel. Accordingly, the signals of the output ends of the GOA units of all levels are consistent with the scan touch signal to decrease the delay of the touch scan signal, and thus to promote the detection accuracy as the embedded touch display panel detects the user's touch operation.

Figure 4:
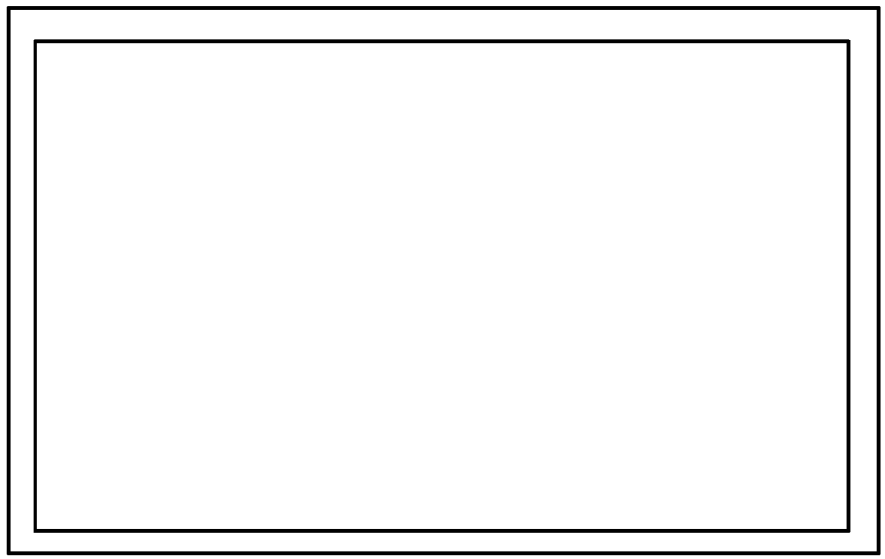
FIG. 4 is a structure diagram of one preferred embodiment of an embedded touch display panel according to the present invention.

Please refer to FIG. 4. The present invention further provides an embedded touch display panel 2. The embedded touch display panel 2 can be applied to the mobile phone, the tablet, the palm computer, the MID (mobile internet device) and the wearable device but not limited thereto. The embedded touch display panel 2 can comprises the GOA drive circuit 1 of any of the aforesaid embodiments, and the repeated description is omitted here.

Above are embodiments of the present invention, which does not limit the scope of the present invention. Any modifications, equivalent replacements or improvements within the spirit and principles of the embodiment described above should be covered by the protected scope of the invention.

What is claimed is:

1. A Gate Driver on Array (GOA) drive circuit, applied in an embedded touch display panel, wherein the GOA drive circuit (1) comprises a plurality of GOA units (10) which are cascade coupled in multilevel, and the nth level GOA unit comprises an output end pull down unit (400) and an output control unit (600), and both the output end pull down unit (400) and the output control unit (600) are employed to control a signal outputted by an output end (G(n)) of the nth level GOA unit, and one end of the output end pull down unit (400) is electrically coupled to a first end point (L), and the first end point (L) is loaded with a first signal, and one end of the output control unit (600) is electrically coupled to a nth clock signal (CK(n)), and as the embedded touch display panel enters signal interrupt and performs a touch scan stage, the output control unit (600) is off to cut off an output path that the nth clock signal (CK(n)) outputs to the output end (G(n)), and the output end pull down unit (400) is on to output the first signal through an output end of the GOA unit, wherein as the embedded touch display panel enters signal interrupt and performs the touch scan stage, the first signal is a signal consistent with a touch scan signal of the embedded touch display panel; and wherein the output control unit (600) comprises a first thin film transistor (NT10) and a second first thin film transistor (NT13), and both the first thin film transistor (NT10) and the second first thin film transistor (NT13) comprise a gate, a first end and a second end, and the first end of the first thin film transistor (NT10) is electrically coupled to the output end (G(n)) of the nth level GOA unit, and the second end of the first thin film transistor (NT10) receives the nth clock signal (CK(n)), and the gate of the first thin film transistor (NT10) is electrically coupled to the second end of the second first thin film transistor (NT13), and the gate of the second first thin film transistor (NT13) receives the nth clock signal (CK(n)), and the first end of the second first thin film transistor (NT13) is loaded with a voltage level of a first node Q(n); as the embedded touch display panel enters signal interrupt and performs the touch scan stage, the output control unit (600) makes both the first thin film transistor (NT10) and the second first thin film transistor (NT13) off under control of the voltage level of the first node Q(n) and the nth clock signal (CK(n)) to close the output control unit (600), wherein the first end is a source and the second end is a drain, or the first end is a drain and the second end is a source.

2. The GOA drive circuit according to claim 1, wherein the nth level GOA unit further comprises a first node control unit (100), a second node pull down control unit (200), a forward-backward scan level transfer control unit (300), a second-node pull up control unit (500) and a voltage stabilizing unit (700);

the first node control unit (100) comprises a third thin film transistor (NT11) and a fourth thin film transistor (NT5), and both the third thin film transistor (NT11) and the fourth thin film transistor (NT5) comprise a gate, a first end and a second end, and the gate of the third thin film transistor (NT11) is electrically coupled to an output end (G(n−2)) of the (n−2)th level GOA unit, and the first end of the third thin film transistor (NT11) is electrically coupled to a first end point (L), and the second end of the third thin film transistor (NT11) is electrically coupled to a second node (P(n)), and the gate of the fourth thin film transistor (NT5) is electrically coupled to the second node (P(n)), and the first end of the fourth thin film transistor (NT5) is electrically coupled to the first end point (L), and the second end of the fourth thin film transistor (NT5) is electrically coupled to the first node Q(n), wherein the first end point (L) is loaded with the first signal;

the second node pull down control unit (200) comprises a fifth thin film transistor (NT6), and the fifth thin film transistor (NT6) comprises a gate, a first end and a second, and the gate of the fifth thin film transistor (NT6) is electrically coupled to the first node Q(n), and the first end of the fifth thin film transistor (NT6) is electrically coupled to the first end point (L), and the second end of the fifth thin film transistor (NT6) is electrically coupled to the second node (P(n));

the forward-backward scan level transfer control unit (300) comprises a sixth thin film transistor (NT1) and a seventh thin film transistor (NT2), and both the sixth thin film transistor (NT1) and the seventh thin film transistor (NT2) comprise a gate, a first end and a second end, and the gate of the sixth thin film transistor (NT1) is electrically coupled to the output end (G(n−2)) of the (n−2)th level GOA unit, and the first end of the sixth thin film transistor (NT1) is electrically coupled to the first node (Q(n)), and the second end of the sixth thin film transistor (NT1) receives a forward scan control signal (U2D), and the gate of the seventh thin film transistor (NT2) is electrically coupled to an output end (G(n+2)) of the (n+2)th level GOA unit, and the first end of the seventh thin film transistor (NT2) is electrically coupled to the first node (Q(n)), and the second end of the seventh thin film transistor (NT2) receives a backward scan control signal (D2U);

the output end pull down unit (400) comprises an eighth thin film transistor (NT9) and a ninth thin film transistor (NT12), and both the eighth thin film transistor (NT9) and a ninth thin film transistor (NT12) comprise a gate, a first end and a second end, and the gate and the first end of the eighth thin film transistor (NT9) are electrically coupled to two ends of a first capacitor (C1) respectively, and the gate of the eighth thin film transistor (NT9) is electrically coupled to the second node (P(n)), and the first end of the eighth thin film transistor (NT9) is electrically coupled to the first end point (L), and the second end of the eighth thin film transistor (NT9) is electrically coupled to the second node (P(n)) through a second capacitor (C2), and the second end of the eighth thin film transistor (NT9) is electrically coupled to the output end (G(n)) of the nth level GOA unit, and the gate of the ninth thin film transistor (NT12) receives a global control signal (GAS1), and the first end of the ninth thin film transistor (NT12) is electrically coupled to the first end point (L), and the second end of the ninth thin film transistor (NT12) is electrically coupled to the output end (G(n)) of the nth level GOA unit;

the second node pull up control unit (500) comprises a tenth thin film transistor (NT3), an eleventh thin film transistor (NT4) and a twelfth thin film transistor (NT8), and all the tenth thin film transistor (NT3), the eleventh thin film transistor (NT4) and the twelfth thin film transistor (NT8) comprise a gate, a first end and a second end, and the gate of the tenth thin film transistor (NT3) receives a forward scan control signal (U2D), and the first end of the tenth thin film transistor (NT3) is electrically coupled to the gate of the twelfth thin film transistor (NT8), and the second end of the tenth thin film transistor (NT3) is electrically coupled to a (n−1)th clock signal (CK(n−1)), and the gate of the eleventh thin film transistor (NT4) receives a backward scan control signal (D2U), and the first end of the eleventh thin film transistor (NT4) is electrically coupled to the gate of the twelfth thin film transistor (NT8), and the second end of the eleventh thin film transistor (NT4) is electrically coupled to a (n+1)th clock signal (CK(n+1)), and the first end of the twelfth thin film transistor (NT8) is electrically coupled to the second node (P(n)), and the second end of the twelfth thin film transistor (NT8) is electrically coupled to a second end point (H), and the second end point (H) is loaded with a second signal, the GOA unit (10) further comprises the voltage stabilizing unit (700), and the voltage stabilizing unit (700) comprises a thirteenth thin film transistor (NT7), and the thirteenth thin film transistor (NT7) comprises a gate, a first end and a second end, and the gate of the thirteenth thin film transistor (NT7) is electrically coupled to the second end point (H), and the first end of the thirteenth thin film transistor (NT7) is electrically coupled to the first node (Q(n)), and the second end of the thirteenth thin film transistor (NT7) is electrically coupled to the first end of the second first thin film transistor (NT13), wherein the first ends and the second ends of the respective thin film transistors respectively are sources and drains, or the first ends and the second ends of the respective thin film transistors respectively are drains and sources;

as the embedded touch display panel normally displays, one of the first signal and the second signal is low voltage level and the other is high voltage level, and one of the forward scan control signal (U2D) and the backward scan control signal (D2U) is low voltage level and the other is high voltage level, and the global control signal (GAS1) controls the ninth thin film transistors (NT12) in the GOA units of all levels to be off, and the output end (G(n)) employs the nth clock signal (CK(n)) to be a gate scan signal to be outputted; as the embedded touch display panel enters signal interrupt and performs the touch scan, the first signal is a pulse signal consistent with the touch control signal, and voltage levels of the forward scan control signal (U2D) and the backward scan control signal (D2U) are both high or both low, and the nth clock signal (CK(n)) controls the second first thin film transistor (NT13) to be off, and the global control signal (GAS1) controls the ninth thin film transistors (NT12) in the GOA units of all levels to be on, and output ends of the GOA units of all levels output the first signal which is consistent with the touch scan signal.

3. The GOA drive circuit according to claim 2, wherein in the first level GOA unit and the second level GOA unit, both the gates of the sixth thin film transistor (NT1) and the third thin film transistor (NT11) receive a start signal of the GOA drive circuit; in the last level GOA unit and the next to last level GOA unit, the gate of the seventh thin film transistor (NT2) receives the start signal of the GOA drive circuit.

4. The GOA drive circuit according to claim 2, wherein all the respective thin film transistors are N type thin film transistors; as the embedded touch display panel normally displays, the first signal is low voltage level and the second signal is constant voltage high voltage level, and the global control signal (GAS1) is low voltage level, and all the respective clock signals are periodic high voltage level pulse signals; as the embedded touch display panel enters signal interrupt and performs the touch scan, all the respective clock signals are low voltage levels, and the global control signal (GAS1) is high voltage level.

5. The GOA drive circuit according to claim 4, wherein in forward scan, the forward scan control signal (U2D) is constant voltage high voltage level, and the backward scan control signal (D2U) is low voltage level as the embedded touch display panel normally displays, and is high voltage level as entering signal interrupt and performing the touch scan; in backward scan, the backward scan control signal (D2U) is constant voltage high voltage level, and the forward scan control signal (U2D) is low voltage level as the embedded touch display panel normally displays, and is high voltage level as entering signal interrupt and performing the touch scan.

6. The GOA drive circuit according to claim 2, wherein all the respective thin film transistors are P type thin film transistors; as the embedded touch display panel normally displays, the first signal is low voltage level, and the second signal is constant voltage low voltage level, and the global control signal (GAS1) is high voltage level, and all the respective clock signals are periodic low voltage level pulse signals; as the embedded touch display panel enters signal interrupt and performs the touch scan, all the respective clock signals are high voltage levels, and the global control signal (GAS1) is low voltage level.

7. The GOA drive circuit according to claim 6, wherein in forward scan, the forward scan control signal (U2D) is constant voltage low voltage level, and the backward scan control signal (D2U) is high voltage level as the embedded touch display panel normally displays, and is low voltage level as entering signal interrupt and performing the touch scan; in backward scan, the backward scan control signal (D2U) is constant voltage low voltage level, and the forward scan control signal (U2D) is high voltage level as the embedded touch display panel normally displays, and is low voltage level as entering signal interrupt and performing the touch scan.

8. The GOA drive circuit according to claim 2, wherein the GOA drive circuit comprises four clock signals: a first clock signal (CK(1)), a second clock signal (CK(2)), a third clock signal (CK(3)) and a fourth clock signal (CK(4)); as the nth clock signal (CK(n)) is the fourth clock signal (CK(4)), the n+1th clock signal (CK(n+1)) is the first clock signal (CK(1)); as the nth clock signal (CK(n)) is the first clock signal (CK(1)), the n-1th clock signal (CK(n−1)) is the fourth clock signal (CK(4)), and pulse periods of the first clock signal (CK(1)), the second clock signal (CK(2)), the third clock signal (CK(3)) and the fourth clock signal (CK(4)) are the same, and for the mth pulse signals of all the clock signals: as the mth pulse signal of the first clock signal (CK(1)) is finished, the mth pulse signal of the second clock signal (CK(2)) is generated; as the mth pulse signal of the second clock signal (CK(2)) is finished, the mth pulse signal of the third clock signal (CK(3)) is generated; as the mth pulse signal of the third clock signal (CK(3)) is finished, the mth pulse signal of the fourth clock signal (CK(4)) is generated; as the mth pulse signal of the fourth clock signal (CK(4)) is finished, the (m+1)th pulse signal of the first clock signal (CK(1)) is generated, wherein m is a positive integer.

9. An embedded touch display panel, wherein the embedded touch display panel comprises a Gate Driver on Array (GOA) drive circuit (1), and the GOA drive circuit (1) comprises a plurality of GOA units (10) which are cascade coupled in multilevel, and the nth level GOA unit comprises an output end pull down unit (400) and an output control unit (600), and both the output end pull down unit (400) and the output control unit (600) are employed to control a signal outputted by an output end (G(n)) of the nth level GOA unit, and one end of the output end pull down unit (400) is electrically coupled to a first end point (L), and the first end point (L) is loaded with a first signal, and one end of the output control unit (600) is electrically coupled to a nth clock signal (CK(n)), and as the embedded touch display panel enters signal interrupt and performs a touch scan stage, the output control unit (600) is off to cut off an output path that the nth clock signal (CK(n)) outputs to the output end (G(n)), and the output end pull down unit (400) is on to output the first signal through an output end of the GOA unit, wherein as the embedded touch display panel enters signal interrupt and performs the touch scan stage, the first signal is a signal consistent with a touch scan signal of the embedded touch display panel; and wherein the output control unit (600) comprises a first thin film transistor (NT10) and a second first thin film transistor (NT13), and both the first thin film transistor (NT10) and the second first thin film transistor (NT13) comprise a gate, a first end and a second end, and the first end of the first thin film transistor (NT10) is electrically coupled to the output end (G(n)) of the nth level GOA unit, and the second end of the first thin film transistor (NT10) receives the nth clock signal (CK(n)), and the gate of the first thin film transistor (NT10) is electrically coupled to the second end of the second first thin film transistor (NT13), and the gate of the second first thin film transistor (NT13) receives the nth clock signal (CK(n)), and the first end of the second first thin film transistor (NT13) is loaded with a voltage level of a first node Q(n); as the embedded touch display panel enters signal interrupt and performs the touch scan stage, the output control unit (600) makes both the first thin film transistor (NT10) and the second first thin film transistor (NT13) off under control of the voltage level of the first node Q(n) and the nth clock signal (CK(n)) to close the output control unit (600), wherein the first end is a source and the second end is a drain, or the first end is a drain and the second end is a source.

10. The embedded touch display panel according to claim 9, wherein the nth level GOA unit further comprises a first node control unit (100), a second node pull down control unit (200), a forward-backward scan level transfer control unit (300), a second node pull up control unit (500) and a voltage stabilizing unit (700);

the first node control unit (100) comprises a third thin film transistor (NT11) and a fourth thin film transistor (NT5), and both the third thin film transistor (NT11) and the fourth thin film transistor (NT5) comprise a gate, a first end and a second end, and the gate of the third thin film transistor (NT11) is electrically coupled to an output end (G(n−2)) of the (n−2)th level GOA unit, and the first end of the third thin film transistor (NT11) is electrically coupled to a first end point (L), and the second end of the third thin film transistor (NT11) is electrically coupled to a second node (P(n)), and the gate of the fourth thin film transistor (NT5) is electrically coupled to the second node (P(n)), and the first end of the fourth thin film transistor (NT5) is electrically coupled to the first end point (L), and the second end of the fourth thin film transistor (NT5) is electrically coupled to the first node Q(n), wherein the first end point (L) is loaded with the first signal;

the second node pull down control unit (200) comprises a fifth thin film transistor (NT6), and the fifth thin film transistor (NT6) comprises a gate, a first end and a second, and the gate of the fifth thin film transistor (NT6) is electrically coupled to the first node Q(n), and the first end of the fifth thin film transistor (NT6) is electrically coupled to the first end point (L), and the second end of the fifth thin film transistor (NT6) is electrically coupled to the second node (P(n));

the forward-backward scan level transfer control unit (300) comprises a sixth thin film transistor (NT1) and a seventh thin film transistor (NT2), and both the sixth thin film transistor (NT1) and the seventh thin film transistor (NT2) comprise a gate, a first end and a second end, and the gate of the sixth thin film transistor (NT1) is electrically coupled to the output end (G(n−2)) of the (n−2)th level GOA unit, and the first end of the sixth thin film transistor (NT1) is electrically coupled to the first node (Q(n)), and the second end of the sixth thin film transistor (NT1) receives a forward scan control signal (U2D), and the gate of the seventh thin film transistor (NT2) is electrically coupled to an output end (G(n+2)) of the (n+2)th level GOA unit, and the first end of the seventh thin film transistor (NT2) is electrically coupled to the first node (Q(n)), and the second end of the seventh thin film transistor (NT2) receives a backward scan control signal (D2U);

the output end pull down unit (400) comprises an eighth thin film transistor (NT9) and a ninth thin film transistor (NT12), and both the eighth thin film transistor (NT9) and a ninth thin film transistor (NT12) comprise a gate, a first end and a second end, and the gate and the first end of the eighth thin film transistor (NT9) are electrically coupled to two ends of a first capacitor (C1) respectively, and the gate of the eighth thin film transistor (NT9) is electrically coupled to the second node (P(n)), and the first end of the eighth thin film transistor (NT9) is electrically coupled to the first end point (L), and the second end of the eighth thin film transistor (NT9) is electrically coupled to the second node (P(n)) through a second capacitor (C2), and the second end of the eighth thin film transistor (NT9) is electrically coupled to the output end (G(n)) of the nth level GOA unit, and the gate of the ninth thin film transistor (NT12) receives a global control signal (GAS1), and the first end of the ninth thin film transistor (NT12) is electrically coupled to the first end point (L), and the second end of the ninth thin film transistor (NT12) is electrically coupled to the output end (G(n)) of the nth level GOA unit;

the second node pull up control unit (500) comprises a tenth thin film transistor (NT3), an eleventh thin film transistor (NT4) and a twelfth thin film transistor (NT8), and all the tenth thin film transistor (NT3), the eleventh thin film transistor (NT4) and the twelfth thin film transistor (NT8) comprise a gate, a first end and a second end, and the gate of the tenth thin film transistor (NT3) receives a forward scan control signal (U2D), and the first end of the tenth thin film transistor (NT3) is electrically coupled to the gate of the twelfth thin film transistor (NT8), and the second end of the tenth thin film transistor (NT3) is electrically coupled to a (n−1)th clock signal (CK(n−1)), and the gate of the eleventh thin film transistor (NT4) receives a backward scan control signal (D2U), and the first end of the eleventh thin film transistor (NT4) is electrically coupled to the gate of the twelfth thin film transistor (NT8), and the second end of the eleventh thin film transistor (NT4) is electrically coupled to a (n+1)th clock signal (CK(n+1)), and the first end of the twelfth thin film transistor (NT8) is electrically coupled to the second node (P(n)), and the second end of the twelfth thin film transistor (NT8) is electrically coupled to a second end point (H), and the second end point (H) is loaded with a second signal, the GOA unit (10) further comprises the voltage stabilizing unit (700), and the voltage stabilizing unit (700) comprises a thirteenth thin film transistor (NT7), and the thirteenth thin film transistor (NT7) comprises a gate, a first end and a second end, and the gate of the thirteenth thin film transistor (NT7) is electrically coupled to the second end point (H), and the first end of the thirteenth thin film transistor (NT7) is electrically coupled to the first node (Q(n)), and the second end of the thirteenth thin film transistor (NT7) is electrically coupled to the first end of the second first thin film transistor (NT13), wherein the first ends and the second ends of the respective thin film transistors respectively are sources and drains, or the first ends and the second ends of the respective thin film transistors respectively are drains and sources;

as the embedded touch display panel normally displays, one of the first signal and the second signal is low voltage level and the other is high voltage level, and one of the forward scan control signal (U2D) and the backward scan control signal (D2U) is low voltage level and the other is high voltage level, and the global control signal (GAS1) controls the ninth thin film transistors (NT12) in the GOA units of all levels to be off, and the output end (G(n)) employs the nth clock signal (CK(n)) to be a gate scan signal to be outputted;

as the embedded touch display panel enters signal interrupt and performs the touch scan, the first signal is a pulse signal consistent with the touch control signal, and voltage levels of the forward scan control signal (U2D) and the backward scan control signal (D2U) are both high or both low, and the nth clock signal (CK(n)) controls the second first thin film transistor (NT13) to be off, and the global control signal (GAS1) controls the ninth thin film transistors (NT12) in the GOA units of all levels to be on, and output ends of the GOA units of all levels output the first signal which is consistent with the touch scan signal.

11. The embedded touch display panel according to claim 10, wherein in the first level GOA unit and the second level GOA unit, both the gates of the sixth thin film transistor (NT1) and the third thin film transistor (NT11) receive a start signal of the GOA drive circuit; in the last level GOA unit and the next to last level GOA unit, the gate of the seventh thin film transistor (NT2) receives the start signal of the GOA drive circuit.

12. The embedded touch display panel according to claim 10, wherein all the respective thin film transistors are N type thin film transistors; as the embedded touch display panel normally displays, the first signal is low voltage level and the second signal is high voltage level, and the global control signal (GAS1) is low voltage level, and all the respective clock signals are periodic high voltage level pulse signals; as the embedded touch display panel enters signal interrupt and performs the touch scan, all the respective clock signals are low voltage levels, and the global control signal (GAS1) is high voltage level.

13. The embedded touch display panel according to claim 12, wherein in forward scan, the forward scan control signal (U2D) is constant voltage high voltage level, and the backward scan control signal (D2U) is low voltage level as the embedded touch display panel normally displays, and is high voltage level as entering signal interrupt and performing the touch scan; in backward scan, the backward scan control signal (D2U) is constant voltage high voltage level, and the forward scan control signal (U2D) is low voltage level as the embedded touch display panel normally displays, and is high voltage level as entering signal interrupt and performing the touch scan.

14. The embedded touch display panel according to claim 10, wherein all the respective thin film transistors are P type thin film transistors; as the embedded touch display panel normally displays, the first signal is low voltage level, and the second signal is constant voltage low voltage level, and the global control signal (GAS1) is high voltage level, and all the respective clock signals are periodic low voltage level pulse signals; as the embedded touch display panel enters signal interrupt and performs the touch scan, all the respective clock signals are high voltage levels, and the global control signal (GAS1) is low voltage level.

15. The embedded touch display panel according to claim 14, wherein in forward scan, the forward scan control signal (U2D) is constant voltage low voltage level, and the backward scan control signal (D2U) is high voltage level as the embedded touch display panel normally displays, and is low voltage level as entering signal interrupt and performing the touch scan; in backward scan, the backward scan control signal (D2U) is constant voltage low voltage level, and the forward scan control signal (U2D) is high voltage level as the embedded touch display panel normally displays, and is low voltage level as entering signal interrupt and performing the touch scan.

16. The embedded touch display panel according to claim 10, wherein the GOA drive circuit comprises four clock signals: a first clock signal (CK(1)), a second clock signal (CK(2)), a third clock signal (CK(3)) and a fourth clock signal (CK(4)); as the nth clock signal (CK(n)) is the fourth clock signal (CK(4)), the n+lth clock signal (CK(n+1)) is the first clock signal (CK(1)); as the nth clock signal (CK(n)) is the first clock signal (CK(1)), the n-lth clock signal (CK(n−1)) is the fourth clock signal (CK(4)), and pulse periods of the first clock signal (CK(1)), the second clock signal (CK(2)), the third clock signal (CK(3)) and the fourth clock signal (CK(4)) are the same, and for the mth pulse signals of all the clock signals: as the mth pulse signal of the first clock signal (CK(1)) is finished, the mth pulse signal of the second clock signal (CK(2)) is generated; as the mth pulse signal of the second clock signal (CK(2)) is finished, the mth pulse signal of the third clock signal (CK(3)) is generated; as the mth pulse signal of the third clock signal (CK(3)) is finished, the mth pulse signal of the fourth clock signal (CK(4)) is generated; as the mth pulse signal of the fourth clock signal (CK(4)) is finished, the (m+1)th pulse signal of the first clock signal (CK(1)) is generated, wherein m is a positive integer.

* * * * *